US012570014B2

(12) United States Patent
Suto et al.

(10) Patent No.: US 12,570,014 B2
(45) Date of Patent: Mar. 10, 2026

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 162 days.

(21) Appl. No.: 18/397,608

(22) Filed: Dec. 27, 2023

(65) Prior Publication Data

US 2024/0207954 A1 Jun. 27, 2024

(30) Foreign Application Priority Data

| Dec. 27, 2022 | (JP) | ................................. | 2022-210196 |
|---|---|---|---|
| Dec. 27, 2022 | (JP) | ................................. | 2022-210296 |
| Dec. 27, 2022 | (JP) | ................................. | 2022-210302 |
| Dec. 27, 2022 | (JP) | ................................. | 2022-210308 |
| Dec. 27, 2022 | (JP) | ................................. | 2022-210362 |
| Dec. 27, 2022 | (JP) | ................................. | 2022-210372 |
| Dec. 27, 2022 | (JP) | ................................. | 2022-210594 |
| Dec. 27, 2022 | (JP) | ................................. | 2022-210638 |

(51) Int. Cl.

| *B26B 15/00* | (2006.01) |
|---|---|
| *B23D 29/00* | (2006.01) |
| *B23D 33/02* | (2006.01) |
| *B26B 29/04* | (2006.01) |
| *B26B 29/06* | (2006.01) |

(52) U.S. Cl.
CPC ............ B26B 15/00 (2013.01); B23D 29/002 (2013.01); B23D 33/02 (2013.01); B26B 29/04 (2013.01); B26B 29/06 (2013.01)

(58) Field of Classification Search
CPC ......... B26B 29/04; B26B 29/02; B26B 17/02; B26B 17/00; B26B 15/00; B23D 29/026; B23D 29/023; B23D 29/02; A01G 3/037; A01G 3/033; A01G 3/02
See application file for complete search history.

(56) References Cited

U.S. PATENT DOCUMENTS

| 3,688,405 | A | * | 9/1972 | Dutra, Jr. | ................. | A01G 3/02 |
|---|---|---|---|---|---|---|
| | | | | | | 30/135 |
| 5,235,750 | A | | 8/1993 | Brown | | |
| 8,327,548 | B2 | * | 12/2012 | Ronan | .................... | B26B 17/00 |
| | | | | | | 30/186 |

(Continued)

FOREIGN PATENT DOCUMENTS

| EP | 2158803 | A1 | * | 3/2010 | ............. | B26B 13/22 |
|---|---|---|---|---|---|---|
| JP | 2021-171580 | A | | 11/2021 | | |

OTHER PUBLICATIONS

Jun. 25, 2024—(EP) Search Report—App 23220293.7.

*Primary Examiner* — Jennifer S Matthews
(74) *Attorney, Agent, or Firm* — Banner & Witcoff, Ltd.

(57) ABSTRACT

An electric cutting device includes: a pair of cutting blades configured to clamp and cut an object; an electric motor configured to generate a driving force necessary for operating the cutting blades; and a guide plate formed with a recess configured to house the object in advance when the object is cut by the pair of cutting blades. The guide plate is formed such that a width of the recess decreases from an open end side toward an inner side of the recess.

8 Claims, 3 Drawing Sheets

(56) References Cited

U.S. PATENT DOCUMENTS

| | | | | |
|---|---|---|---|---|
| 9,888,632 | B2 * | 2/2018 | Zhou ...................... | A01G 3/037 |
| 2002/0088123 | A1 * | 7/2002 | Nordlin ................... | B26B 17/00 |
| | | | | 30/135 |
| 2004/0158993 | A1 * | 8/2004 | Hasegawa ............... | B26B 29/04 |
| | | | | 30/151 |
| 2015/0251256 | A1 | 9/2015 | Frenken | |
| 2019/0232481 | A1 | 8/2019 | Skinner et al. | |
| 2021/0339410 | A1 | 11/2021 | Hayashi et al. | |

* cited by examiner

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, and Japanese Patent Application No. 2022-210638 filed on Dec. 27, 2022, the entire contents of which are incorporated herein by reference.

TECHNICAL FIELD

The present disclosure relates to an electric cutting device.

BACKGROUND ART

As an electric cutting device, an electric pruning shear as described in JP2021-171580A is known, for example. In an electric cutting device, a pair of cutting blades are operated by a driving force of an electric motor instead of a gripping force of a user, and cut an object to be cut by clamping the object with the pair of cutting blades. The cutting device described in JP2021-171580A is provided with a pair of guide plates so as to sandwich the cutting blades from the outside. The guide plate is formed with a recess for receiving the object to be cut in advance and guiding the object to be cut to a predetermined position when cutting. In a state where the object to be cut is placed at the predetermined position, the object to be cut can be cut by closing the cutting blades.

SUMMARY

In the cutting device described in JP2021-171580A, edges of the recesses have linear portions facing each other and are parallel to each other. In such a configuration, an innermost part of the recess is always set as the above "predetermined position" where the object to be cut is to be placed. Therefore, when cutting the object to be cut, the same portion of the cutting blade always abuts the object to be cut. As a result, the cutting blade may become locally worn within a relatively short period, and the cutting blade may need to be replaced.

Illustrative aspects of the present disclosure provide a cutting device that can reduce a frequency of replacing a cutting blade.

An electric cutting device according to one illustrative aspect of the present disclosure includes: a pair of cutting blades configured to clamp and cut an object; an electric motor configured to generate a driving force necessary for operating the cutting blades; and a guide plate formed with a recess configured to house the object in advance when the object is cut by the pair of cutting blades. The guide plate is formed such that a width of the recess decreases from an open end side toward an inner side of the recess.

In the cutting device configured as described above, the width of the recess provided in the guide plate is not uniform, and the width of the recess is formed to decrease (e.g., become narrower) from an open end side to an inner side of the recess. In such a configuration, when guiding the object into the recess, the above "predetermined position" that the object reaches differs depending on a shape of the object. For example, the object with a small diameter reaches an innermost position of the recess, whereas the object with a large diameter reaches only a midway position, that is, a position closer to the open end side than the inner side of the recess. Therefore, a position of a portion of the cutting blade that abuts the object changes depending on the shape of the object. As a result, local wear of the cutting blade is prevented, and thus, the cutting blade can be used for a long period without being replaced.

According to the present disclosure, a cutting device that can reduce a frequency of replacing a cutting blade is provided.

DESCRIPTION OF EMBODIMENTS

Figure 1:
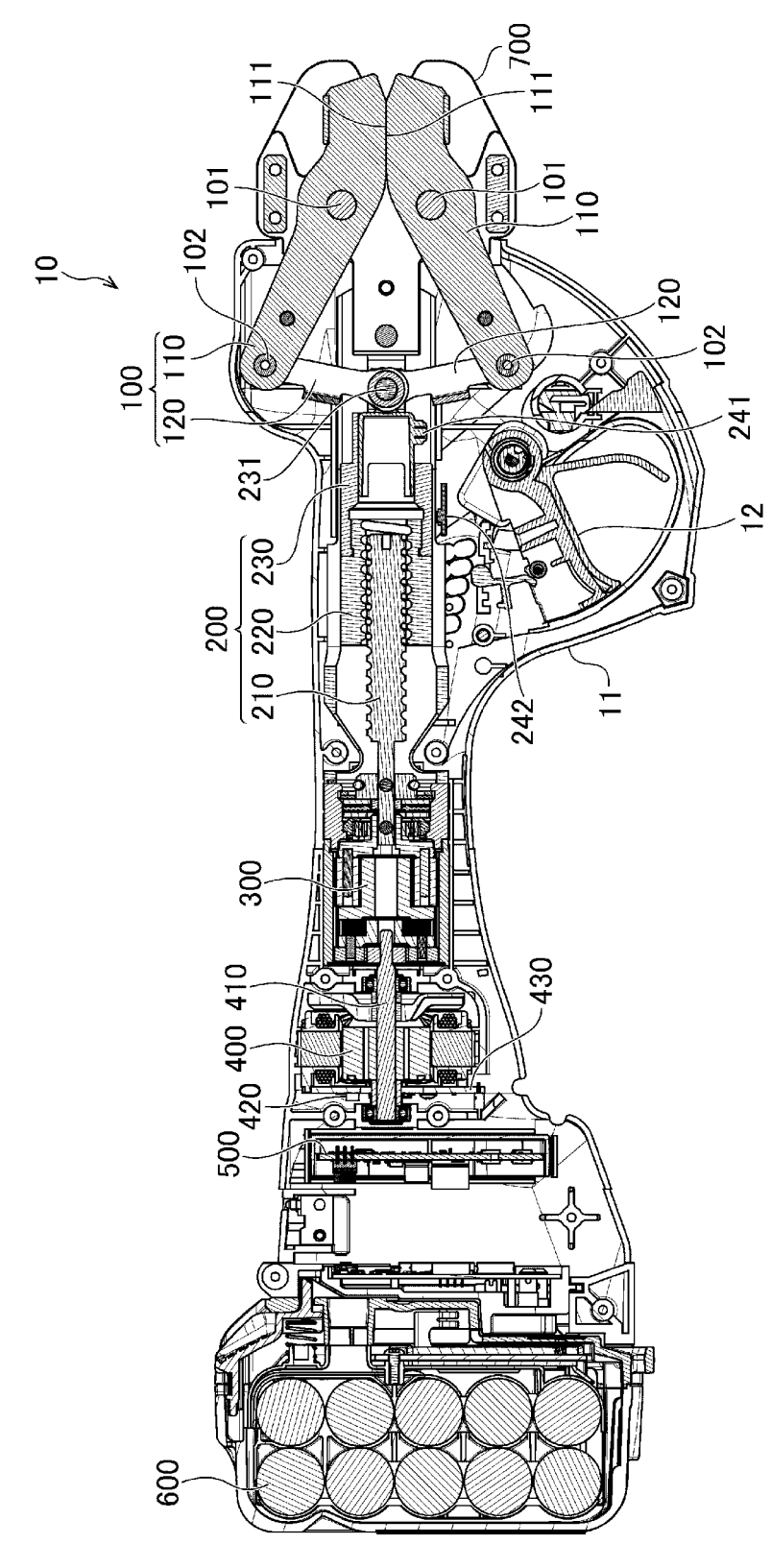
FIG. 1 is a diagram showing a configuration of a cutting device according to a first illustrative embodiment.

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device. The cutting device 10 is configured as a device for cutting a reinforcing bar at a construction site or the like. A configuration of the cutting device 10 will be described mainly with reference to FIG. 1. The cutting device 10 includes a housing 11, a trigger switch 12, a cutting mechanism 100, a ball screw 200, a speed reducer 300, an electric motor 400, a control board 500, and a storage battery 600.

The housing 11 is a container that defines an outer shape of the cutting device 10, and is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and enters into the OFF state. When the trigger switch 12 is switched between an ON state and the OFF state, a corresponding signal is transmitted to the control board 500 described later. If the user performs an operation of switching the trigger switch 12 into the ON state, cutting of the reinforcing bar is started.

The cutting mechanism 100 is a portion configured to cut the reinforcing bar which is an object to be cut. The cutting mechanism 100 includes a pair of blade members 110 and a pair of link members 120.

The cutting blades 111 that clamp and cut the object to be cut are formed on the respective blade members 110. The blade member 110 is held pivotably about a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state where the respective cutting blades 111 are spaced apart from each other and a closed state where the respective cutting blades 111 come into contact with (or close to) each other. In the example of FIG. 1, the pair of cutting blades 111 are in the closed state.

Each link member 120 is a rod-shaped member, and one end of the link member 120 is connected to the blade member 110 via a shaft 102, and the other end of the link member 120 is connected to a connection member 230 described later via a shaft 231. The link member 120 and the blade member 110 are connected to each other in a manner of pivoting about the shaft 102. Similarly, the link member 120 and the connection member 230 are connected to each other in a manner of pivoting about the shaft 231. As will be described later, the connection member 230 moves in a left-right direction in FIG. 1 by a driving force of the electric motor 400.

If the connection member 230 moves in a left direction from the state shown in FIG. 1, the blade member 110 on the upper side in FIG. 1 pivots counterclockwise, and the blade member 110 on the lower side in FIG. 1 pivots clockwise. Accordingly, the pair of cutting blades 111 change from the closed state to the opened state. On the other hand, when the pair of cutting blades 111 are in the opened state, if the connection member 230 moves in the right direction in FIG. 1, the blade member 110 on the upper side in FIG. 1 pivots clockwise, and the blade member 110 on the lower side in FIG. 1 pivots counterclockwise. Accordingly, the pair of cutting blades 111 return to the closed state. Accordingly, the pair of blade members 110, the pair of link members 120, and the connection member 230 as a whole constitute a so-called "toggle link mechanism".

Figure 2:
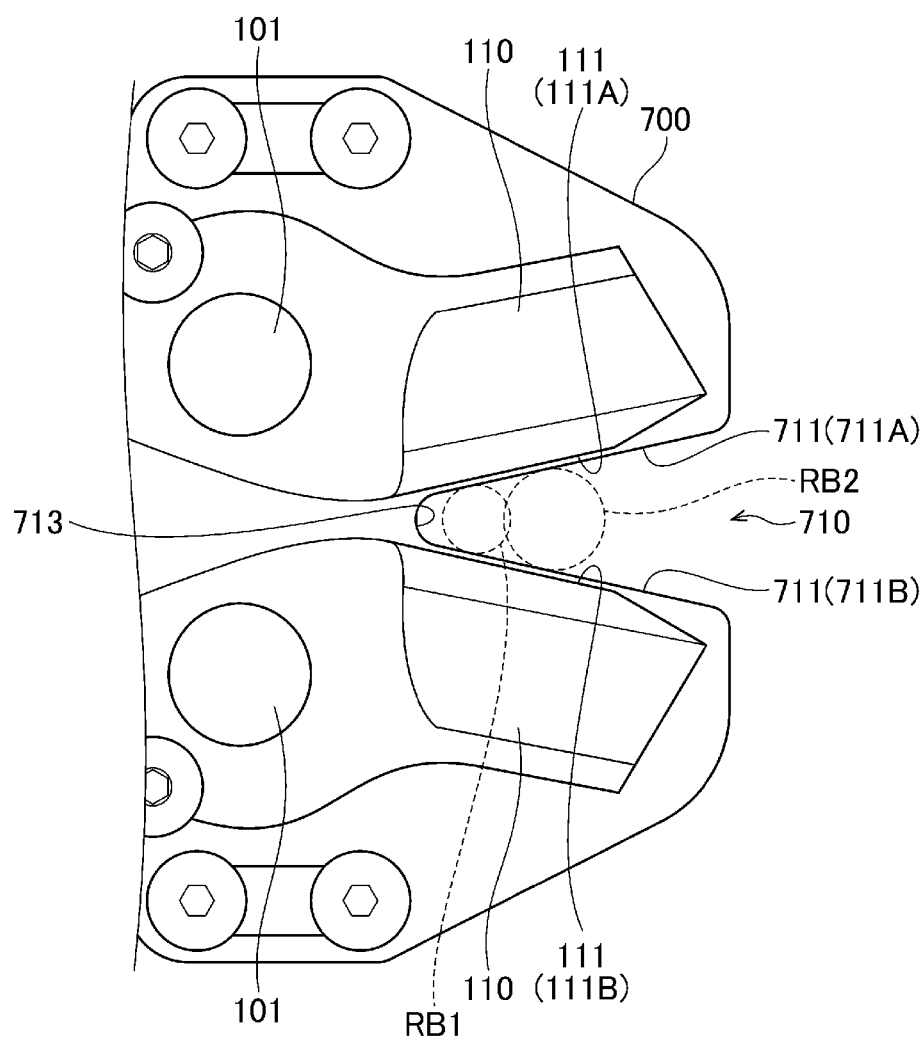
FIG. 2 is a diagram showing a configuration of guide plates included in the cutting device according to the first illustrative embodiment.

A pair of guide plates 700 are provided near the blade members 110. The guide plates 700 are plate-shaped members made of metal. The guide plates 700 are disposed to sandwich the blade members 110 from both the front side and the back side in FIG. 1 when viewed on paper. Shapes of the pair of guide plates 700 are the same. As shown in FIG. 2, each guide plate 700 has a recess 710 formed therein.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from the side as shown in FIG. 1, each recess 710 is formed at a position that includes the cutting blade 111 in the closed state. As shown in FIG. 2, in a standby state where the cutting blades 111 are fully opened, the cutting blades 111 are retracted to the outside of the recesses 710, and the entire blade members 110 are hidden by the guide plates 700.

The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabilizing a posture of the cutting device 10 before and after cutting by sandwiching the reinforcing bar in the recesses 710. A specific configuration of the guide plate 700 will be described later.

The ball screw 200 is a device for converting a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is a member attached to the nut 220 and is a member that moves along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is a device that is configured to reduce a rotation speed of an output shaft 410 of the electric motor 400 and then transmits the rotation to the screw shaft 210 of the ball screw 200.

The electric motor 400 is a rotating electrical machine for generating a driving force necessary for operating the cutting blades 111, and is, for example, a brushless DC motor. The electric motor 400 has the output shaft 410. The output shaft 410 is a substantially cylindrical member, and a central axis thereof coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is configured to emit a pulse signal every time the output shaft 410 rotates by a predetermined angle. The rotation sensor 420 is provided on a board 430 included in the electric motor 400. The pulse signal from the rotation sensor 420 is transmitted to the control board 500. By counting the number of pulse signals, the control board 500 is able to know a rotation angle of the output shaft 410 after a specific timing. The control board 500 is also able to know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410.

The control board 500 is a circuit board provided to control an overall operation of the cutting device 10 including the electric motor 400. The control board 500 includes an inverter circuit for adjusting the current supplied to the electric motor 400, a microcomputer for controlling a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is built can be detached from the housing 11 as a battery pack, and can be connected to an external charger for charging. Instead of such an aspect, a configuration may be adopted in which the storage battery 600 can be charged while the storage battery 600 is attached to the housing 11.

If the user performs the operation of switching the trigger switch 12 into the ON state, the control board 500 detects the operation and causes the cutting blades 111 to operate in a closing direction to cut the reinforcing bar. In order to perform such control, the control board 500 controls an operation of the electric motor 400 while acquiring a current position of the connection member 230.

In the present illustrative embodiment, a count value of the pulse signal input from the rotation sensor 420 is calculated and acquired by the control board 500 as the "current position" of the connection member 230, based on a time when the magnet 241 and the Hall sensor 242 face each other.

In order to enable acquisition of the current position of the connection member 230, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the current position of the connection member 230 can be accurately acquired from then on.

The control board 500 is configured to control an opening and closing operation of the cutting blades 111 by adjusting magnitude of current supplied to the electric motor 400, for example, by PWM control. The control board 500 is also configured to control a braking operation of the cutting blades 111 by performing a so-called "short braking" that short-circuits some of a plurality of coils included in the electric motor 400 periodically or continuously.

The above control is merely an example. The control executed by the control board 500 may cause the cutting blades 111 to operate according to the state of the trigger switch 12, and various known kinds of control may be employed.

The specific configuration of the guide plate 700 will be described with reference to FIG. 2. As described above, each guide plate 700 has the recess 710 formed therein. The recess 710 is for housing the reinforcing bar in advance when the cutting blades 111 cut the reinforcing bar. The recess 710 of the present illustrative embodiment is formed in a manner of extending along the central axis of the screw shaft 210 from the front end side (an open end side of the recess 710) toward the rear end side (an inner side of the recess 710). However, a width of the recess 710 is not constant. The width of the recess 710 may gradually becomes narrower from the open end side toward the inner side of the recess 710. The "width" of the recess 710 is a dimension of the recess 710 along a direction where the pair of cutting blades 111 face each other and along a direction perpendicular to the central axis of the screw shaft 210. That is, the "width" is a dimension in an upper-lower direction in FIG. 2.

An edge of the recess 710 includes a pair of linear portions 711 that are linear portions facing each other, and an arc portion 713 located between the pair of linear portions 711. Each linear portion 711 extends from a position that is substantially the open end of the recess 710 to the arc portion 713. Accordingly, in an innermost part of the recess 710, the two linear portions 711 are connected in an arc shape by the arc portion 713.

For convenience of description, the linear portion 711 located on the upper side in FIG. 2 of the pair of linear portions 711 is also referred to as a "first linear portion 711A" below. The linear portion 711 on the lower side in FIG. 2 is also referred to as a "second linear portion 711B" below. Similarly, the cutting blade 111 located on the upper side in FIG. 2 is also referred to as a "first cutting blade 111A" below. Similarly, the cutting blade 111 located on the lower side in FIG. 2 is also referred to as a "second cutting blade 111B" below.

The blade members 110 pivot about the shaft 101 to cause the cutting blades 111 of the present illustrative embodiment to change a position thereof between the closed state in FIG. 1 and the opened state in FIG. 2. In the standby state before cutting the reinforcing bar, the cutting blades 111 are in the opened state shown in FIG. 2.

As shown in FIG. 2, when viewed along a rotation central axis of the cutting blades 111 (that is, the central axis of the shaft 101), if the cutting blades 111 are in the opened state, the first cutting blade 111A is located at an upper side of the first linear portion 711A (on an opposite side to the recess 710), and the second cutting blade 111B is located at a lower side of the second linear portion 711B (on an opposite side to the recess 710). In other words, the cutting blades 111 are disposed at positions on both sides with the recesses 710 sandwiched therebetween and do not overlap the recesses 710. Since each cutting blade 111 is hidden behind the guide plate 700, the cutting blade 111 in the standby state can be protected by the guide plate 700.

When cutting the reinforcing bar, the cutting blades 111 are opened as shown in FIG. 2, and the reinforcing bar is inserted into the recesses 710 in advance. That is, the recesses 710 receive the reinforcing bar. The reinforcing bar is inserted from the open side of the recess 710 until a position as deep as possible is reached.

If the width of the recesses 710 does not change depending on the position and is substantially constant as in the related art, the reinforcing bar inserted into the recesses 710 always reaches the innermost position of the recesses 710 and is then cut, regardless of the shape of the reinforcing bar. In this case, since the same portion of the cutting blade 111 always abuts the object to be cut, a problem may arise in that the cutting blade 111 becomes locally worn within a short period, and the cutting blade 111 needs to be replaced.

In the configuration in the related art in which the reinforcing bar always reaches the innermost positions of the recesses 710, if the diameter of the reinforcing bar is substantially equal to the width of the recesses 710, an idle running time from when the cutting blade 111 starts operating until the cutting blade 111 abuts the reinforcing bar is short. On the other hand, if the diameter of the reinforcing bar is smaller than the width of the recesses 710, a problem may arise in that the idle running time from when the cutting blade 111 starts operating until the cutting blade 111 abuts the reinforcing bar becomes longer, and a working time becomes longer correspondingly.

Therefore, in the present illustrative embodiment, the various problems described above are solved by varying the width of the recesses 710 depending on the position.

A reference numeral "RB1" shown in FIG. 2 represents a position that a reinforcing bar with a small diameter reaches, and a reference numeral "RB2" represents a position that a reinforcing bar with a large diameter reaches. In this way, the position that the reinforcing bar inserted into the recesses 710 reaches before the cutting changes depending on the shape of the reinforcing bar. Therefore, the position of the portion of the cutting blade 111 that abuts the reinforcing bar also changes depending on the shape of the reinforcing bar. As a result, local wear of the cutting blade 111 is reduced, and thus, the cutting device 10 can be used for a long period without replacing the cutting blade 111.

In the state shown in FIG. 2, a ridge line of a front end of the cutting blade 111 sandwiching the first linear portion 711A with the reinforcing bar and disposed outside the recess 710, that is, the first cutting blade 111A, is parallel to the first linear portion 711A. Similarly, a ridge line of a front end of the cutting blade 111 sandwiching the second linear portion 711B with the reinforcing bar and disposed outside the recess 710, that is, the second cutting blade 111B, is parallel to the second linear portion 711B.

In such a configuration, regardless whether the reinforcing bar is located at RB1 or RB2 in FIG. 2, the idle running time from when the cutting blade 111 starts operating in the closing direction until the cutting blade 111 abuts the reinforcing bar is substantially the same. Since the idle running time does not increase depending on the shape of the reinforcing bar, the problem that the working time becomes longer does not occur.

Figure 3:
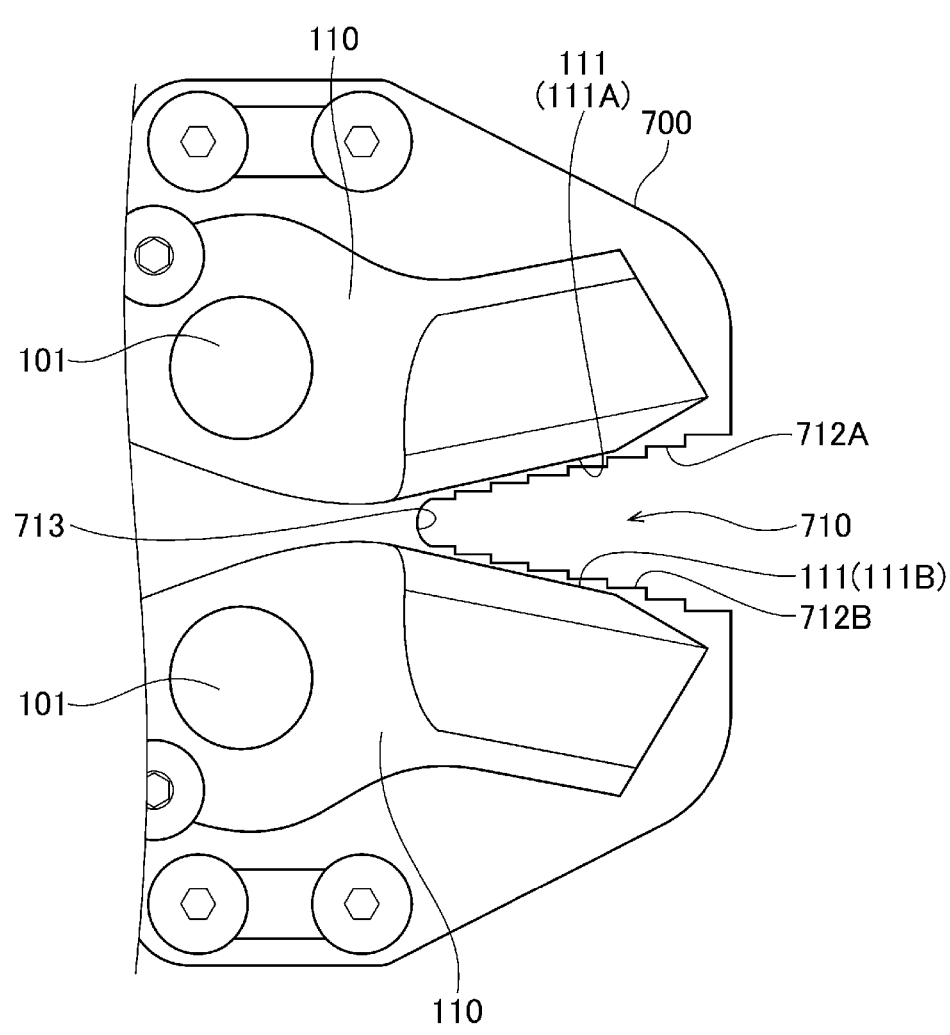
FIG. 3 is a diagram showing a configuration of guide plates included in a cutting device according to a second illustrative embodiment.

A second illustrative embodiment will be described with reference to FIG. 3. In the following, points different from the first illustrative embodiment will be mainly described, and descriptions of points common to those of the first illustrative embodiment will be omitted as appropriate.

The present illustrative embodiment differs from the first illustrative embodiment in FIG. 2 in the shape of the recess 710. A reference numeral "712A" shown in FIG. 3 represents an edge of the recess 710 that corresponds to the first linear portion 711A in the first illustrative embodiment. A reference numeral "712B" represents an edge of the recess 710 that corresponds to the second linear portion 711B in the first illustrative embodiment. In the present illustrative embodiment, as in the first illustrative embodiment, the width of the recesses 710 is formed to decrease (e.g., become narrower) from the open end side toward the inner side. However, in the present illustrative embodiment, each of the edges 712A and 712B is formed not in a linear shape, but in a step shape. The same effect as that described in the first illustrative embodiment can also be achieved in such an aspect. The edges 712A and 712B, which face with each other, are parallel to each other. In the second illustrative embodiment shown in FIG. 2, seven steps are formed.

However, the number of steps may be appropriately set as long as at least one step is formed, and a plurality of steps in a range between two steps and eleven steps may be formed, for example.

The shape of the recess 710 may be different from the above-explained illustrative embodiments. For example, each of the edges 712A and 712B may be formed in the step shape at the open end side of the recess 710 and then be formed in the linear shape toward the inner side of the recess 710. Alternatively, each of the edges 712A and 712B may be formed in the step shape at the open end side of the recess 710 and then be formed in the linear shape toward the inner side of the recess 710 with reducing the width of the recess 710. On the other hand, each of the edges 712A and 712B may be formed in the linear shape toward the inner side of the recess 710 with reducing the width of the recess 710 at the open end side of the recess 710, and then be formed in the step shape toward the inner side of the recess 710 with reducing the width of the recess 710. Alternatively, each of the edges 712A and 712B may be formed in the linear shape toward the inner side of the recess 710 at the open end side of the recess 710, and then be formed in the step shape toward the inner side of the recess 710 with reducing the width of the recess 710.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:
   a pair of cutting blades configured to clamp and cut an object;
   an electric motor configured to generate a driving force necessary for operating the cutting blades; and
   a guide plate formed with a recess configured to house the object in advance when the object is cut by the pair of cutting blades,
   wherein the guide plate is formed such that a width of the recess decreases from an open end side toward an inner side of the recess,
   wherein each of the cutting blades is configured to be switched between an opened state and a closed state by pivoting, and
   wherein when viewed along a rotation central axis of the cutting blades,
      in a case where the cutting blades are in the opened state, the cutting blades are disposed at positions on both sides with the recess sandwiched therebetween and do not overlap the recess.

2. The cutting device according to claim 1, wherein an edge of the recess includes a first linear portion and a second linear portion that are opposite to each other and are each linear.

3. The cutting device according to claim 2, wherein in the case where the cutting blades are in the opened state,
   a ridge line of a front end of the cutting blade sandwiching the first linear portion and disposed outside the recess is parallel to the first linear portion, and a ridge line of a front end of the cutting blade sandwiching the second linear portion and disposed outside the recess is parallel to the second linear portion.

4. The cutting device according to claim 2, wherein in an innermost part of the recess, the first linear portion and the second linear portion are connected in an arc shape.

5. The cutting device according to claim 4, wherein the first linear portion and the second linear portion extends such that a distance between the first linear portion and the second linear portion becomes gradually narrower from the open end side toward the innermost part of the recess.

6. The cutting device according to claim 2, the first linear portion and the second linear portion, which face with each other, are parallel to each other.

7. The cutting device according to claim 6, wherein the first linear portion and the second linear portion are formed in a step shape with reducing the width of the recess toward the inner side of the recess.

8. The cutting device according to claim 7, wherein the first linear portion and the second linear portion are formed in the step shape having a plurality of steps.

\* \* \* \* \*